July 14, 1959 J. E. BRYDEN 2,895,128

SCATTER RADIATION COMMUNICATION SYSTEM USING BURSTS OF RADIO FREQUENCY ENERGY

Filed Jan. 13, 1954

INVENTOR
JOSEPH ERASTO BRYDEN

BY
[signature]
ATTORNEY 2,895,128
Patented July 14, 1959

2,895,128

SCATTER RADIATION COMMUNICATION SYSTEM USING BURSTS OF RADIO FREQUENCY ENERGY

Joseph Easto Bryden, Harrow, England, assignor to The General Electric Company Limited, London, England Application January 13, 1954, Serial No. 403,780

Claims priority, application Great Britain January 16, 1953

4 Claims. (Cl. 343—203)

Figure 1:
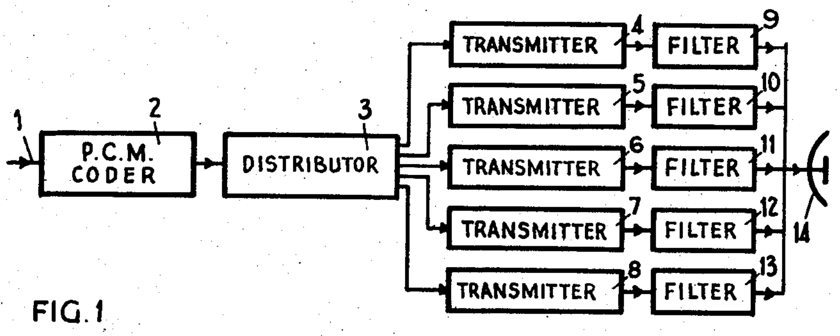

The present invention relates to radio communication systems.

It is well known that, by making use of ionized layers in the ionosphere, it is possible to effect radio communication between points that are well outside optical range. The upper limit of the band of frequencies used for such communication is of the order of 30 megacycles per second. At higher frequencies, say over 40 megacycles per second, the radiation passes through the ionized layers and is not reflected therefrom so that it has generally been believed that communication at these frequencies is not possible for practical purposes over distances much beyond optical range. Occasionally it is, however, possible to effect long distance radio communication at these frequencies but this appears to be due to freak conditions and since it does not occur regularly this phenomena cannot be used to provide a commercial communication channel.

It has recently been reported in the National Bureau of Standards Technical News Bulletin, volume 36, No. 10 at page 148 and in the Bell Laboratories Record, volume 30, No. 6 at page 245 that at these higher frequencies some radiation is regularly received over distances, up to several hundred miles, that are very much greater than had hitherto been thought possible. The manner in which the electromagnetic energy is propagated over such a distance is not completely understood at the present time but hereinafter in this specification it is referred to as "scatter radiation."

The level of signal received by scatter radiation is very low indeed so that to obtain a useful signal-to-noise ratio at a receiver it is necessary for the transmitter to radiate very high power energy. By scatter radiation, energy reaches the receiver aerial over a plurality of paths which are believed to be of very different lengths and transmission over these several paths will, of course, take substantially different periods of time. If now the transmitter were to radiate a burst of radio frequency energy, having the envelope of a rectangular pulse, it will be realised that the pulse defined by the envelope of the received energy will extend over a very much longer period than the transmitted pulse and will have no sharply defined leading or trailing edges. Thus if a train of pulses were transmitted in this manner, the pulses being modulated in known manner by the intelligence to be signalled, this distortion of each pulse would necessitate a very low pulse repetition frequency since otherwise the received pulses would overlap.

It is one object of the present invention to provide a radio communication system utilising scatter radiation.

According to the present invention, a radio communication system utilises scatter radiation and intelligence is transmitted by the presence or absence of a burst of radio frequency energy at a succession of time intervals, the frequency of said bursts of energy at adjacent time intervals being different.

The modulation may be of the type known as pulse code modulation. For example, the amplitude of each sample of the intelligence to be signalled may be approximately defined by the presence or absence of a burst of energy at each of a group of adjacent time intervals, the energy that may be radiated at each of these time intervals of the group being different. Thus the several bursts of energy that are transmitted to define a sample are transmitted at different frequencies so that any overlap of the received bursts does not matter as they are separated by virtue of their different frequencies. Alternatively only two different frequencies may be used, these being associated with alternate intervals.

The invention is more generally applicable to any system in which intelligence is signalled by the presence or absence of pulses and may for example be used for transmitting relatively low frequency telegraph signals.

Figure 2:
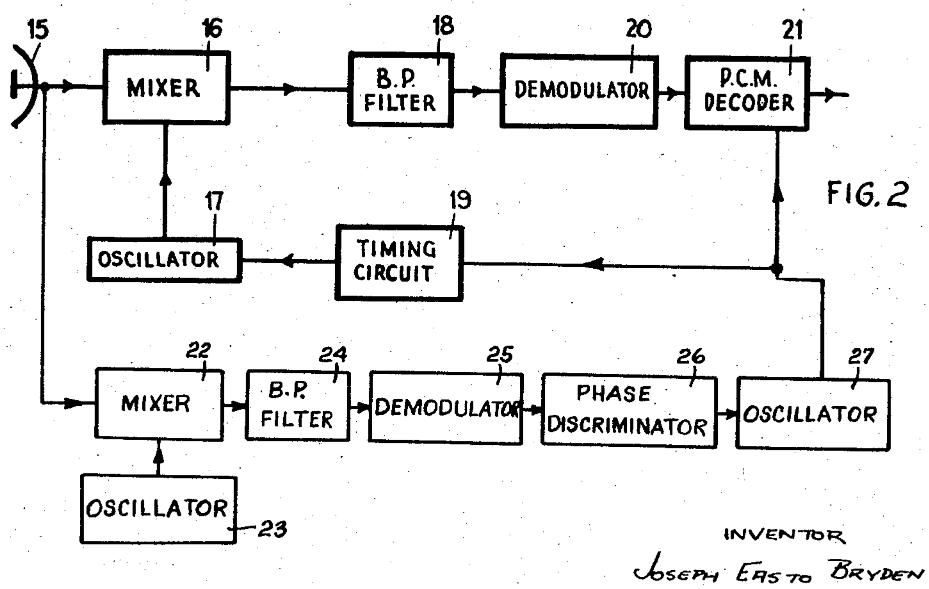

One example in accordance with the present invention of a radio communication system which utilises scatter radiation will now be described by way of example with reference to the two figures of the accompanying drawing in which Figures 1 and 2 show diagrammatically the transmitting and receiving stations respectively of the system.

Referring to Figure 1 of the accompanying drawing, the transmitting station comprises an input path 1 over which the signal to be transmitted is supplied to a coder 2 which is adapted to generate a pulse code signal. The coder 2 is in fact adapted periodically to sample the signal supplied over the path 1 and to define approximately the amplitude of each sample by the presence or absence of a pulse at each of a small number, for example five, successive time intervals of the signal supplied thereby.

A plurality of high power radio transmitters 4 to 8 are provided at the transmitting station. These transmitters 4 to 8 are each arranged to operate at a different frequency and these frequencies may have a 30 to 40 megacycle per second separation in the region of 2,000 megacycles per second.

The pulse code signal supplied by the coder 2 is fed to a distributor 3 which is arranged to supply pulses occurring at the successive time intervals of the pulse code signal as modulation to the transmitters 4 to 8 in turn. The transmitter 4, for example, thus supplies a burst of energy whenever a pulse occurs in the first time interval of a group defining a sample of the signal supplied over the path 1, the transmitter 5 supplies a burst of radio frequency energy whenever a pulse occurs in the second time interval of a group, and so on.

The radio frequency energy supplied by each of the transmitters 4 to 8, which may include a magnetron, is fed through an isolating band-pass filter 9, 10, 11, 12 or 13 to a common aerial system 14. Each of the filters 9 to 13 is tuned to pass the radio frequency energy supplied by its associated transmitter. Alternatively each of the transmitters 9 to 13 may have its own aerial system.

The transmitters 4 to 8 may be such that when a pulse having a duration of 1 micro-second is supplied by the distributor 3 the appropriate transmitter generates a burst of radio frequency energy having a peak power of 50 megawatts.

The receiving station is well beyond optical range from the transmitting station, say 500 miles away. Referring now to Figure 2, the receiving station has an aerial system 15 and the wide-band radio signal picked up thereby is fed to a mixer 16. It will be realised that the receiver is required to determine whether or not this signal contains a component of a particular frequency at each of a plurality of time intervals irrespective of there being any components of other frequencies at that interval. For this purpose the frequency of a local oscillator 17 which supplies an oscillation to the mixer 16 is arranged to be varied in steps so that it has a different frequency of operation for each time interval of the received signal. This arrangement is such that if any one of the transmitters 4 to 8 is modulated so as to cause a burst of radio frequency energy to be transmitted, the local oscillator 17 has the correct frequency for an interval during which the level of the burst of received radio frequency energy is greatest so that the mixer 16 then supplies an intermediate frequency pulse of a predetermined frequency, say 60 megacycles per second. Such an intermediate frequency pulse is also of predetermined duration due to the limited time that the oscillator 17 has the correct frequency to heterodyne with the signal received as a result of that transmission so that the pulse cannot extend into the adjacent intervals in which similar pulses may occur.

The intermediate frequency signal is selected from the output of the mixer 16 by means of a band-pass filter 18. The filter 18 is designed to give a good signal-to-noise ratio and the pass band thereof is therefore such that it excludes frequencies which are obtained by heterodyning at any instant the output of the oscillator 17 with components of the received signal that are due to energy transmitted by any one of the transmitters 4 to 8 other than the one appropriate to that instant. The intermediate frequency signal thus consists of a signal of the said frequency having an envelope formed by the required code pulses. This intermediate frequency signal is passed to a demodulator 20 which operates to reproduce the original pulse code signal which is then fed to a pulse decoder 21.

A timing circuit 19 provides a signal that is utilised to vary the frequency of the oscillator 17 in the manner stated. This circuit 19 may generate a signal having a stepped waveform and a recurrence frequency equal to the frequency of sampling by the coder 2.

In order that synchronism may be maintained between the transmitting and receiving stations, it is desirable that some synchronising information shall be transmitted between them. This may be done, as in known pulse code modulation signalling systems, by arranging so that the coder 2 supplies a pulse at periodically recurrent time intervals of the pulse code signal supplied thereby, say at every fiftieth time interval. In that case the transmitter 4, for example, is periodically caused to transmit a burst of radio frequency energy irrespective of the amplitude of the input signal supplied over the path 1 at that instant. At the receiving station the frequency of the transmitter 4 is constantly monitored and for this purpose a portion of the signal received by the aerial 15 is fed to another mixer 22 where it is heterodyned with the output from a fixed frequency oscillator 23. A band-pass filter 24 is arranged to select from the output of this mixer 22 the intermediate frequency signal due to energy transmitted by the transmitter 4. This intermediate frequency signal is then demodulated by means of a demodulator 25 and the resulting pulse signal is utilised by means of a phase discriminator 26 to control the phase of an oscillator 27 that has a very high frequency stability. Over a relatively long period the phase of operation of the oscillator 27 is therefore locked from the transmitting station and this oscillator is utilised to control both the phasing of the timing circuit 19 and of the decoder 21.

I claim:

1. A radio communication system which utilises scatter radiation comprising a transmitting station and a receiving station that is located beyond the optical range of the transmitting station, the transmitting station comprising means to generate an electric pulse signal in which a pulse may selectively be present or absent at each of a succession of time intervals that are regularly recurrent at a predetermined frequency, radio transmitting means, means to cause the said radio transmitting means to transmit a burst of radio frequency energy when a pulse occurs in the said signal, and means periodically and at the said predetermined frequency to vary the operating frequency of the radio transmitting means in a range of frequencies above thirty megacycles per second so that if pulses occur at any two adjacent pulse intervals of the said pulse signal there is caused to be transmitted two bursts of radio frequency energy that are of different frequencies, the time intervals in which these bursts are transmitted being sequential so that they do not overlap, the receiving station comprising radio receiving means and means periodically and at the said predetermined frequency to vary the tuning of the radio receiving means in step with the variation in the operating frequency of the radio transmitting means at the transmitting station so that when the radio receiving means is tuned to receive radio frequency energy transmitted in any one of said pulse intervals, it is not capable of receiving energy transmitted in an adjacent interval due to the difference in frequency, the radio receiving means thereby demodulating the received radio frequency energy to reproduce the said pulse signal.

2. A radio communication system according to claim 1 wherein the means to generate an electric pulse signal at the transmitting station is a pulse code modulation coder.

3. A radio communication system according to claim 2 wherein the coder comprises an input path over which is supplied information to be signalled, means periodically to sample the information supplied over the said path, and means to produce the said pulse signal in which each sample is represented selectively by the presence or absence of a pulse at each of a plurality of time intervals, the said means to vary the operating frequency of the radio transmitting means being arranged to cause the radio transmitting means to have a different operating frequency for each of the several time intervals associated with any sample of the information supplied over the input path.

4. A radio communication system according to claim 1 wherein the means to vary the operating frequency of the radio transmitting means at the transmitting station is arranged to cause the radio transmitting means to have only two operating frequencies which are each associated with alternate pulse intervals of the said pulse signal.

References Cited in the file of this patent

UNITED STATES PATENTS

| | | |
|---|---|---|
| 1,633,100 | Heising | June 21, 1927 |
| 2,444,750 | Ptacek | July 6, 1948 |
| 2,502,154 | Jeffers | Mar. 28, 1950 |
| 2,565,008 | Wallace | Aug. 21, 1951 |
| 2,676,203 | Phelps | Apr. 20, 1954 |
| 2,691,776 | Brandon | Oct. 12, 1954 |
| 2,705,795 | Fisk | Apr. 5, 1955 |